(12) United States Patent
Mikutsu

(10) Patent No.: US 9,395,607 B2
(45) Date of Patent: Jul. 19, 2016

(54) IMAGE PROJECTION APPARATUS INCLUDING A SHIELD

(71) Applicant: Yasunari Mikutsu, Tokyo (JP)

(72) Inventor: Yasunari Mikutsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 14/289,028

(22) Filed: May 28, 2014

(65) Prior Publication Data

US 2014/0362352 A1    Dec. 11, 2014

(30) Foreign Application Priority Data

Jun. 10, 2013   (JP) .................................. 2013-121822

(51) Int. Cl.
 *G03B 21/14*  (2006.01)
 *G03B 21/16*  (2006.01)
 *G03B 33/08*  (2006.01)
 *G03B 21/00*  (2006.01)
 *G03B 21/20*  (2006.01)

(52) U.S. Cl.
 CPC ............. *G03B 21/142* (2013.01); *G03B 21/16* (2013.01); *G03B 21/2093* (2013.01); *G03B 33/08* (2013.01); *G03B 21/008* (2013.01); *G03B 21/208* (2013.01); *G03B 21/2066* (2013.01)

(58) Field of Classification Search
 CPC ........ G03B 21/14; G03B 21/16; G03B 21/00; G03B 21/20; G03B 21/08; H04N 5/75
 See application file for complete search history.

(56) References Cited

U.S. PATENT DOCUMENTS

| 2004/0036967 A1* | 2/2004 | Haggerty | .............. F21S 10/007 359/443 |
| 2004/0062043 A1* | 4/2004 | Vastola | ................ H04N 9/3197 362/293 |
| 2006/0152689 A1 | 7/2006 | Oh et al. | |
| 2007/0147064 A1* | 6/2007 | Huang | ................ G02B 6/4298 362/551 |

(Continued)

FOREIGN PATENT DOCUMENTS

| CN | 1805520 A | 7/2006 |
| CN | 1825198 A | 8/2006 |

(Continued)

OTHER PUBLICATIONS

European Search Report dated Jul. 22, 2015 issued in corresponding European Application No. 14168723.6.

(Continued)

*Primary Examiner* — Sultan Chowdhury
*Assistant Examiner* — Danell L Owens
(74) *Attorney, Agent, or Firm* — Harness, Dickey & Pierce, P.L.C.

(57) ABSTRACT

An image projection apparatus includes a light source that emits light; an image generation element to generate an image; an optical radiation system to irradiate the image generation element using the light emitted from the light source; an optical projection system to project the image generated by the image generation element onto a projection face; a color wheel, disposed on a light path of light emitted from the light source, to separate the light while being rotated; a light tunnel to guide light exiting from the color wheel to the optical radiation system; and a shield disposed in a space between the color wheel and the light tunnel in a light radiation direction from which the light from the light source is irradiated. The shield covers at least a part of a side of the light tunnel facing a rotation center of the color wheel.

7 Claims, 8 Drawing Sheets

(56) References Cited

U.S. PATENT DOCUMENTS

2007/0216871 A1 9/2007 Yoshikawa et al.
2011/0037956 A1* 2/2011 Lin ..................... G02B 6/0096
353/98

FOREIGN PATENT DOCUMENTS

| | | |
|---|---|---|
| CN | 101042518 A | 9/2007 |
| EP | 1681876 A2 | 7/2006 |
| EP | 1837702 A1 | 9/2007 |
| JP | 2004-212726 | 7/2004 |
| JP | 2004-239934 | 8/2004 |
| JP | 2007-147965 | 6/2007 |
| JP | 20008-292887 A | 12/2008 |
| JP | 2008292887 A | 12/2008 |
| JP | 2012-063567 | 3/2012 |
| TW | 2006-08132 A | 3/2006 |

OTHER PUBLICATIONS

Chinese Office Action dated Jul. 29, 2015 issued in corresponding Chinese Patent Application No. 201410252880.1.

* cited by examiner

IMAGE PROJECTION APPARATUS INCLUDING A SHIELD

CROSS-REFERENCE TO RELATED APPLICATION

This application claims priority pursuant to 35 U.S.C. §119 to Japanese Patent Application No. 2013-121822, filed on Jun. 10, 2013 in the Japan Patent Office, the disclosure of which is incorporated by reference herein in its entirety.

BACKGROUND

1. Technical Field

The present invention relates to an image projection apparatus.

2. Background Art

Image projection apparatuses known as projectors have been widely used with the advancement of higher resolution of liquid crystal panels, enhancement of brightness of light source lamps due to higher efficiency, and lower price. Further, light-weight and compact image projection apparatuses using digital micro-mirror devices (DMD) as an image generation element have been widely used in offices, schools, and homes. For example, front type projectors having enhanced portability have been used for small meetings of several persons.

Further, projectors are demanded to project a larger image while also demanded to be compact for a projection space required outside the projectors. Recently, short focus projectors having a projection distance of 1 m to 2 m and a projection size of 60 inches to 80 inches have been developed. When projectors having a longer projection distance are placed on a table in a meeting room, the projectors need to be placed at position on the table far from a screen. By contrast, the short focus projectors can be placed near the screen on a table, with which a rear space of projectors on the table can be used freely.

The image projection apparatus includes a light source such as a lamp. Temperature in the image projection apparatus increases when the light source is ON. Therefore, the image projection apparatus includes a cooling unit such as an air-intake port and an air-discharge port to prevent temperature increase, and fans such as an air-intake fan and an air-discharge fan are disposed near each of the air-intake port and air-discharge port to generate forced air draft.

Further, the image projection apparatus having the air-intake port and air-discharge port includes an optical radiation system and an optical projection system, wherein the optical radiation system radiates light emitted from the light source to an image generation element, and the optical projection system projects an image generated by the image generation element to a projection face. As to this image projection apparatus, dust in air may intrude inside the image projection apparatus through the air-intake port and air-discharge port, and then may stay in a light path in the optical radiation system and the optical projection system, with which images having error such as poor quality images may be projected.

In view of this dust intrusion into the apparatus, an air filter can be provided before the air-intake fan to reduce an amount of dust intrusion, and optical parts can be sealed so that dust does not intrude in the optical radiation system and the optical projection system.

However, when the air filter is disposed before the air-intake fan, an air-intake area decreases, with which wind amount decreases and cooling performance in the apparatus decreases. In this case, rotation speed of the fan can be increased to maintain the cooling performance, but the increased rotation speed increases noise. Further, when dust adheres on the air filter, the cooling performance decreases, in which the apparatus is stopped and a user needs to clean and replace the air filter periodically, which is not convenient.

When the optical parts are sealed to prevent dust intrusion in the optical radiation system and the optical projection system, dust does not adhere on a light path in the optical radiation system and the optical projection system, and a normal projection image can be generated. However, some parts cannot be sealed. For example, a color wheel and a light tunnel disposed between the light source and the optical radiation system cannot be sealed because they are required to be cooled by air. Therefore, if dust adheres inside the light tunnel, luminance of projection image decreases.

SUMMARY

In one aspect of the present invention, an image projection apparatus is devised. The image projection apparatus includes a light source that emits light; an image generation element to generate an image; an optical radiation system to irradiate the image generation element using the light emitted from the light source; an optical projection system to project the image generated by the image generation element onto a projection face; a color wheel, disposed on a light path of light emitted from the light source, to separate the light while being rotated; a light tunnel to guide light exiting from the color wheel to the optical radiation system; and a shield disposed in a space between the color wheel and the light tunnel in a light radiation direction from which the light from the light source is irradiated. The shield covers at least a part of a side of the light tunnel facing a rotation center of the color wheel.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5(*b*) is a schematic view the color wheel and the light tunnel viewed from the light tunnel;

FIG. 6(*b*) is a schematic view of the color wheel, the light tunnel and the shield viewed from the light tunnel.

Figure 1:
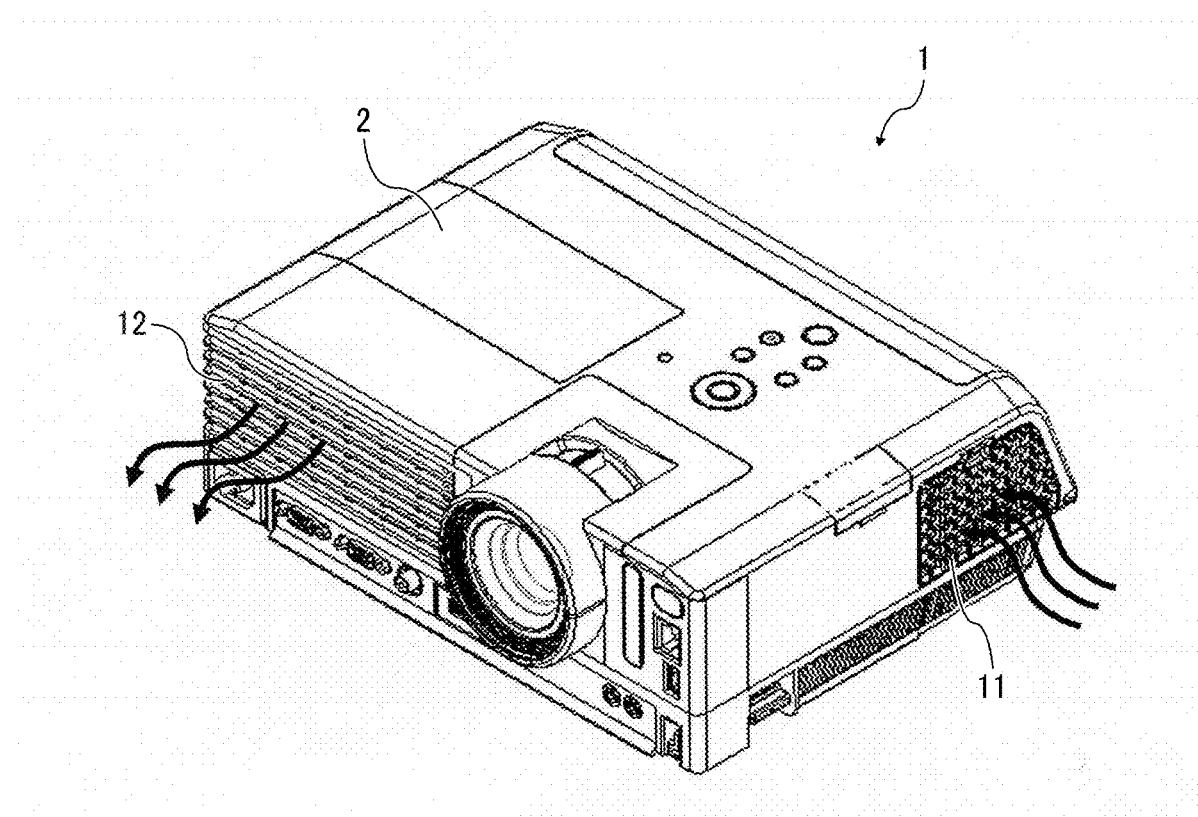
FIG. 1 is a schematic perspective view of an image projection apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

An image projection apparatus 1 according to an example embodiment includes, for example, a light source such as a light source unit 4, an image generation element (image generation element unit 10, DMD element 10a), an optical radiation unit or system (relay lens 7, flat-face mirror 8, concave-face mirror 9), an optical projection unit or system, a color wheel 5, a light tunnel 6, and a shield 20.

Figure 2:
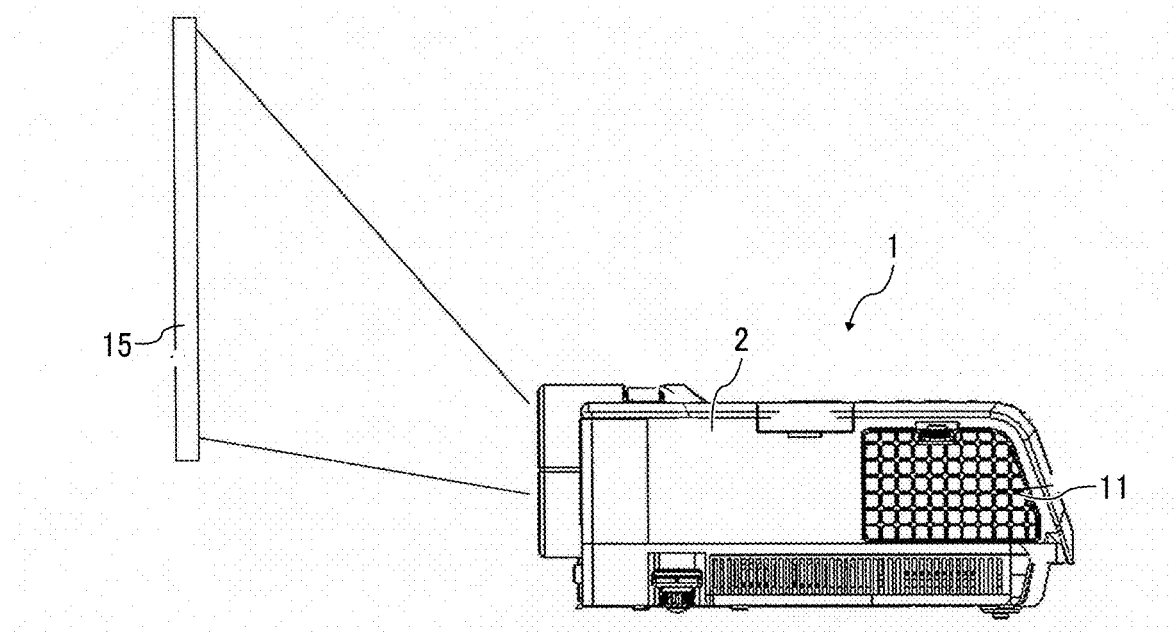
FIG. 2 is a schematic side view of the image projection apparatus of FIG. 1 and a light projection to a screen used as a projection face.

The light source such as the light source unit 4 emits light. The image generation element, including such as an image generation element unit 10 and a digital mirror device (DMD) element 10a, generates an image. The optical radiation unit or system, including such as a relay lens 7, a flat-face minor 8, a concave-face minor 9, radiates the image generation element using light from the light source. The optical projection unit or system projects the image generated by the image generation element onto a projection face such as a screen 15 (FIG. 2).

The color wheel 5 is disposed on a light path of light emitted from the light source, and separates light when rotating about the axis of the color wheel 5. The light tunnel 6 guides light exiting from the color wheel 5 to the optical radiation unit or system. The shield 20 is disposed in a space between the color wheel 5 and the light tunnel 6 along a light radiation direction from the light source, and the shield 20 shields or covers at least a portion of the light tunnel 6 facing the center of the color wheel 5.

(Image Projection Apparatus)

FIG. 1 is a schematic perspective view of the image projection apparatus 1 according to an example embodiment. FIG. 2 is a schematic side view of the image projection apparatus 1 of FIG. 1 showing a light projection to a screen used as a projection face.

The image projection apparatus 1 is, for example, a projector, which generates images based on image data input from an information processing apparatus such as a personal computer (PC) and an image capturing apparatus such as a video camera, and projects the images onto the screen 15.

The image projection apparatus 1 includes a lamp as a light source and many electronic circuits therein, and temperature inside the image projection apparatus 1 increases when the image projection apparatus 1 is activated. Therefore, the image projection apparatus 1 includes an air-intake port 11 and an air-discharge port 12 so that the inside temperature does not exceed heat-resistance temperature of internal components, in which an air-cooling system using forced air draft is typically employed.

Figure 3A:
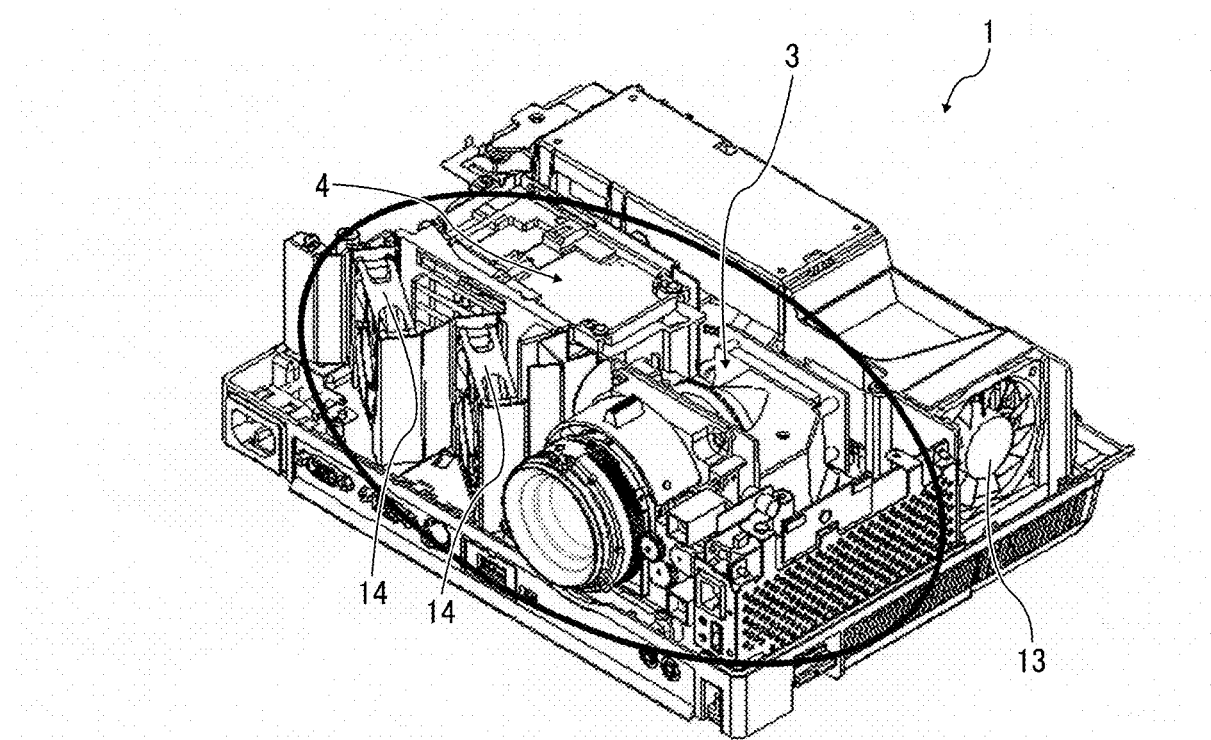
FIG. 3A is a schematic perspective view of the image projection apparatus of FIG. 1 when an outer cover is removed.
Figure 3B:
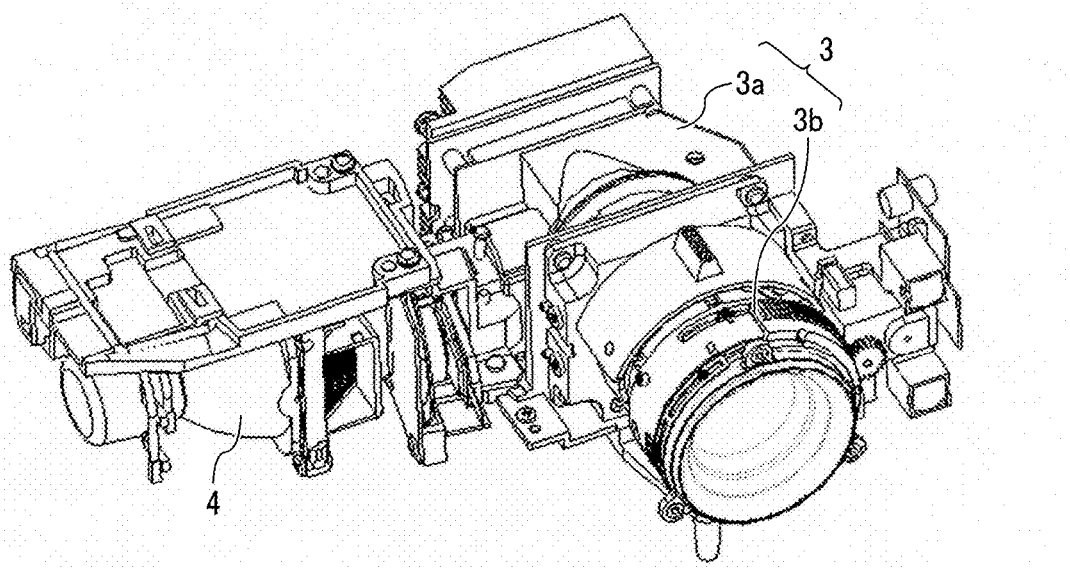
FIG. 3B is an expanded view of a portion indicated by a circular line in FIG. 3A
Figure 4:
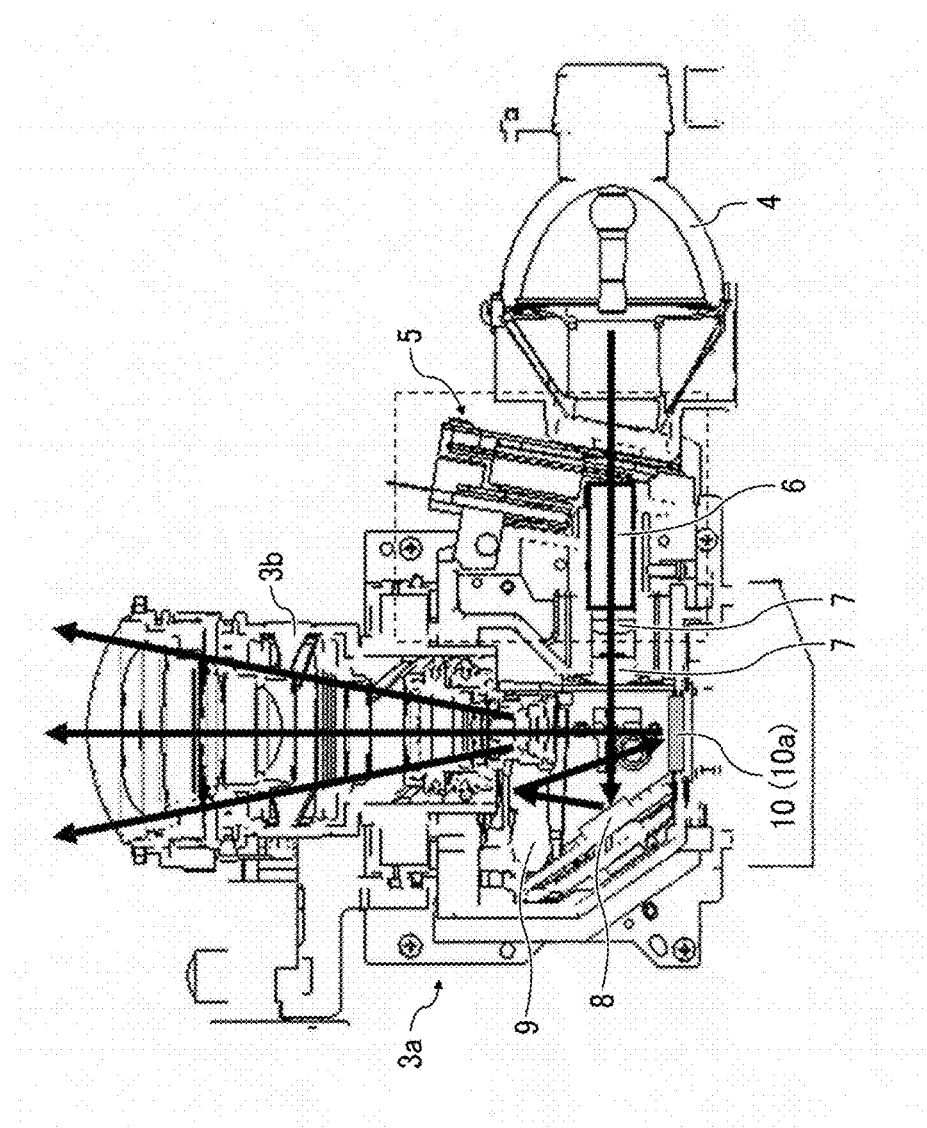
FIG. 4 is a schematic cross-sectional view of an optical irradiation unit, an optical projection unit, and a light source unit.

FIG. 3A is a schematic perspective view of the image projection apparatus 1 when an outer cover 2 is removed. FIG. 3B is an expanded view of an optical engine 3 and a light source unit 4 indicated by a circular line in FIG. 3A. As illustrated in FIGS. 3A and 3B, the image projection apparatus 1 includes, for example, the optical engine 3 and the light source unit 4. FIG. 4 is a schematic cross-sectional view of the optical engine 3 and the light source unit 4. The optical engine 3 includes a radiation unit 3a used as an optical radiation system and the projection unit 3b used as an optical projection system.

As illustrated in FIG. 3, an air-intake fan 13 is disposed inside the air-intake port 11, and an air-discharge fan 14 is disposed inside the air-discharge port 12. The inside of the image projection apparatus 1 can be cooled by forced air draft which can be generated by in-taking air from the air-intake fan 13 and discharging the air from the air-discharge fan 14.

As to the image projection apparatus 1, light (i.e., white light) from the light source unit 4 used as the light source is radiated to the radiation unit 3a of the optical engine 3. In the radiation unit 3a, the radiated white light is separated into red, green and blue (RGB) light, and then guided to the image generation element unit 10 by using the optical radiation system. The image generation element unit 10 generates an image based on modulated signals, and then the optical projection system such as the projection unit 3b enlarges and projects the image onto the screen 15.

The light source of the light source unit 4 is, for example, a high pressure mercury lamp. Further, the radiation unit 3a of the optical engine 3 includes, for example, the color wheel 5, the light tunnel 6, and the relay lens 7, the flat-face mirror 8 and the concave-face mirror 9. The color wheel 5 separates light emitted from the light source. The light tunnel 6 guides light exiting from the color wheel 5 to the optical radiation system, wherein the relay lens 7, the flat-face mirror 8 and the concave-face minor 9 can be collectively used as the optical radiation system. Further, the radiation unit 3a includes the image generation element unit 10.

In the radiation unit 3a, the white light from the light source is sequentially converted into RGB light for each unit time by the color wheel 5 having a disk shape, and the light exits from the color wheel 5. Then, the light exiting from the color wheel 5 is guided to the light tunnel 6 having a cylindrical shape composed of glass plates.

Then, the light exiting from the light tunnel 6 is condensed by the relay lens 7 composed of two lenses while correcting chromatic aberration on the optical axis. Further, the light exiting from the relay lens 7 is reflected by the flat-face mirror 8 and the concave-face mirror 9, and is radiated to the image generation element unit 10. The image generation element unit 10 includes a digital micro-mirror device (DMD) element 10a used as an image generation element. The DMD element 10a includes a plurality of micro mirrors having shaped the mirror face as rectangular shape. Each of the micro minors is time-divisionally driven based on image data, with which the micro minors reflect light to generate projection light used for forming a given image.

Based on the time-divisional image data, the DMD element 10a having the plurality of micro mirrors reflects light used for projection (i.e., projection light) to a projection lens, and reflects light not used for projection to an OFF plate. The projection light reflects from the image generation element unit 10 to the projection unit 3b, and the projection light passing through a plurality of projection lenses in the projection unit 3b is enlarged and projected onto the screen 15.

In the radiation unit 3a, each of the relay lens 7, the flat-face mirror 8, the concave-face mirror 9, the image generation element unit 10, and the projection unit 3b can be covered with a housing at the light incident side, and mating faces of the housings are sealed by a seal member.

The color wheel 5 is a rotator that rotates at a high rotation speed such as 7,000 rpm to 12,000 rpm (rotation per minute) by using a driver such as a motor. Because the driver of the color wheel 5 generates heat, the driver is required to be cooled under a given temperature so that the driver can be used under a safe condition. Due to such requirement, the color wheel 5 is difficult to seal.

Further, the light tunnel 6, which is typically a hollow tube structure, is disposed near the color wheel 5. Further, because a holding member of the light tunnel 6 becomes high temperature due to light reflected inside the light tunnel 6, the light tunnel 6 is required to be cooled. Due to such requirement, the light tunnel 6 is also difficult to seal.

As described above, the color wheel 5 and the light tunnel 6 are required to be disposed in an open space, and required to be cooled using air supplied by forced air draft.

Figure 5:
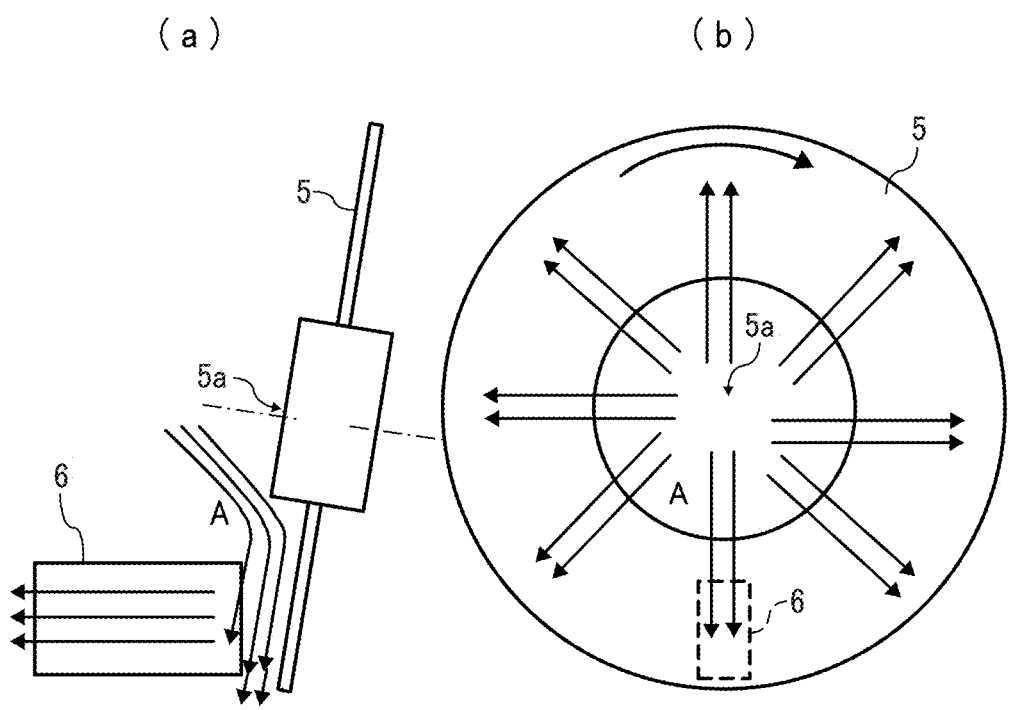
FIG. 5(*a*) is a schematic side view of a color wheel and a light tunnel.

A description is given of airflow generated for cooling the color wheel 5 and the light tunnel 6 using air. FIG. 5(a) is a schematic side view of the color wheel 5 and the light tunnel 6. FIG. 5(b) is a schematic view of the color wheel 5 and the light tunnel 6 viewed from a side of the light tunnel 6, in which the light tunnel 6 is indicated by a dotted line. In consideration of vibrations during rotation, the color wheel 5 is spaced apart from the light tunnel 6 with a given clearance set along the light radiation direction from the light source. For example, the clearance is several millimeters such as 2 mm to 3 mm. Further, as illustrated in FIG. 5, the rotation axis of the color wheel 5 is disposed with a given angle (i.e., slanted) with respect to an optical axis of light extending from the light source to the light tunnel 6.

As described above, the color wheel 5 (i.e., rotator) is rotated in a direction shown by an arrow in FIG. 5(b) with high speed by using a direct current (DC) motor. Because the airflow speed near the rotator is fast, a negative pressure occurs easily, with which an airflow occurs from the center of the rotator (i.e., rotation center 5a) toward the outer periphery of the rotator (i.e., rotation center 5a).

Further, when dust in external air is taken in the image projection apparatus 1 through the air-intake port 11 and the air-intake fan 13 of the image projection apparatus 1, an airflow contaminated by dust may be intaken to the rotation center 5a of the color wheel 5.

The airflow that has entered from the rotation center 5a of the color wheel 5 flows along a face of the color wheel 5 as indicated by an arrow "A" (hereinafter, airflow "A") illustrated in FIG. 5(b) when the color wheel 5 rotates in a given direction, in which airflow "A" flowing from the rotation center 5a to the outer periphery of the color wheel 5 occurs with a radial pattern.

As illustrated in FIG. 5, the light tunnel 6 is disposed at one portion facing the peripheral of the color wheel 5. Therefore, the airflow "A" is taken into the inside of the light tunnel 6 as illustrated in FIG. 5(a), with which dust included in the airflow "A" may adhere inside the light tunnel 6.

If dust adheres inside the light tunnel 6, light transmittance of glass of the light tunnel 6 decreases due to adhered dust, with which luminance of projection light or projection image may decrease.

(Shield) In view of the dust issue, the image projection apparatus 1 according to an example embodiment includes the shield 20 at a space between the color wheel 5 and the light tunnel 6 along the light radiation direction from the light source unit 4. The shield 20 shields at least at one portion of the light tunnel 6 facing the rotation center 5a of the color wheel 5. With this configuration, an airflow pattern occurring around the color wheel 5 can be changed so that airflow intrusion to the light tunnel 6 can be blocked, with which adhesion of dust included in airflow to the inside of the light tunnel 6 can be suppressed, in particular prevented.

FIG. 6(a) is a schematic side view of the color wheel 5 and the light tunnel 6 disposed with the shield 20 between the color wheel 5 and the light tunnel 6. FIG. 6(b) is a schematic view of the color wheel 5, the light tunnel 6 and the shield 20 viewed from the light tunnel 6.

Figure 6:
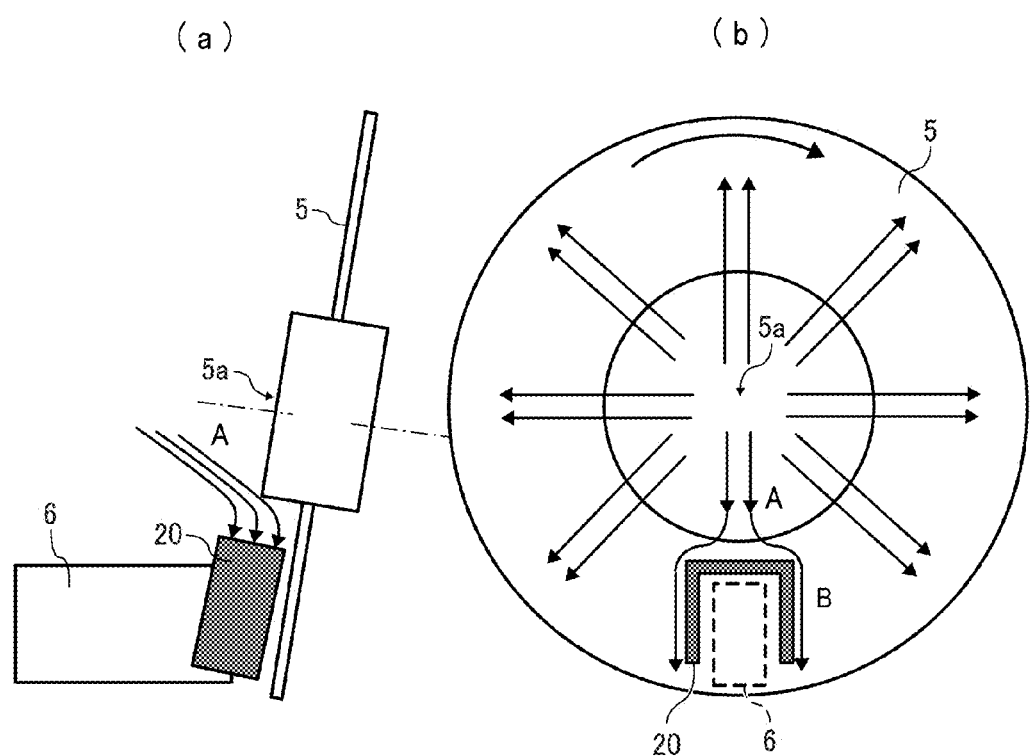
FIG. 6(*a*) is a schematic side view of the color wheel and the light tunnel having disposed with a shield between the color wheel and the light tunnel.

As illustrated in FIG. 6, the shield 20 is disposed at a space between the color wheel 5 and the light tunnel 6 along light radiation direction from the light source unit 4 so that the airflow "A" flowing from the rotation center 5a to the outer periphery of the color wheel 5 can be blocked. For example, the shield 20 is disposed to cover a top face and both side faces of the light tunnel 6, in which the top face of the light tunnel 6 is a face facing the rotation center 5a of the color wheel 5. As above described, the shield 20 disposed at the space between the color wheel 5 and the light tunnel 6 covers a given portion of the light tunnel 6 from the top face and both side faces of the light tunnel 6.

When the shield 20 is not disposed, a portion of airflow "A" enters the light tunnel 6 as illustrated in FIG. 5. When the shield 20 is disposed, as illustrated in FIG. 6(b), the airflow "A" changes a flow pattern indicated by an arrow "B" that flows along an outer contour of the shield 20, with which intrusion of dust included in air into the light tunnel 6 can be suppressed, in particular prevented.

In a configuration of FIG. 6, the shield 20 is disposed with a given angle similar to the color wheel 5 to cover the light tunnel 6, but not limited hereto. Further, the shield 20 is required to be disposed without interrupting a light path in the light tunnel 6 shown by a dotted line in FIG. 6(b).

Figure 7A:
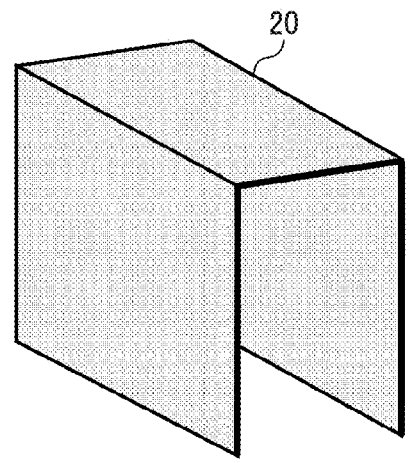
FIGS. 7A, 7B, and 7C are schematic perspective views of examples of shield.
Figure 7B:
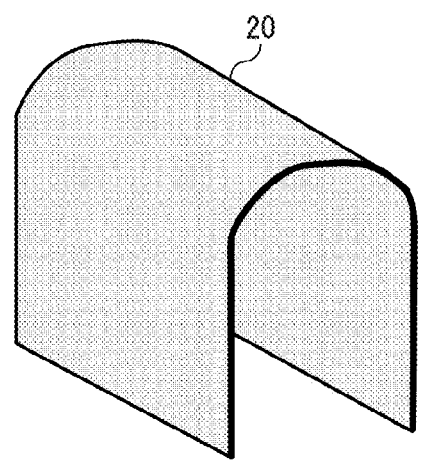
Figure 7C:
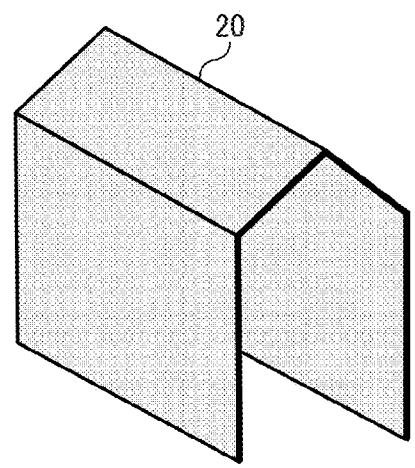

FIG. 7A is a schematic perspective view of one example of the shield 20 illustrated in FIG. 6. The shield 20 of FIG. 7A has a U-shaped configuration having three faces square to the adjacent face to cover the top face and both side faces of the light tunnel 6. The shape of the shield 20 is not limited hereto. For example, the shield 20 can employ a U-shaped configuration having R at the top face as illustrated in FIG. 7B, and the shield 20 can employ a U-shaped configuration having a sharp-angled shape for the top face as illustrated in FIG. 7C.

Further, as described above because the color wheel 5 and the light tunnel 6 become high temperature, components near the color wheel 5 and the light tunnel 6 are required to be made of material having higher heat dissipation. Specifically, the shield 20 is preferably made of materials having higher thermal conductivity such as aluminum, aluminum allow, cupper or the like. For example, by using aluminum having higher heat dissipation, temperature increase of the light tunnel 6 can be suppressed, and heat deformation of glass in the light tunnel 6 can be suppressed. Further, the thickness of the shield 20 can be 0.3 mm or so, but not limited hereto.

Further, the shield 20 can be fixed to the above described position with any fixing methods. For example, the shield 20 can be attached to a member fixing the light tunnel 6, and the shield 20 can be attached to an aperture member disposed near the color wheel 5 and the light tunnel 6. Further, the shield 20 can be integrally formed with an aperture member disposed near the color wheel 5 and the light tunnel 6. Further, the shield 20 can be fixed to an outer periphery of the light tunnel 6.

In a configuration of FIG. 6, the shield 20 is disposed at a portion corresponding to the top face and both side faces of the light tunnel 6 to cover a given portion of space between the light tunnel 6 and the color wheel 5. The shield 20 is preferably disposed at a portion to suppress an intrusion of airflow "A" into the light tunnel 6. The shield 20 is disposed at the space between the light tunnel 6 and the color wheel 5 that can block the airflow from the rotation center 5a of the color wheel 5 at least at one portion. Preferably, the shield 20 is disposed to cover the space corresponding to a given portion extending from the top face (i.e., face facing the rotation center 5a) of the light tunnel 6.

Further, as described above, the shield 20 is preferably disposed to cover the space corresponding to the given portion extending from the top face and both side faces of the light tunnel 6. By covering the both side faces of the light tunnel 6, an airflow that has changed its flow due to the top face may not enter inside the light tunnel 6 by taking a flow pattern of rounding about the shield 20.

Figure 8:
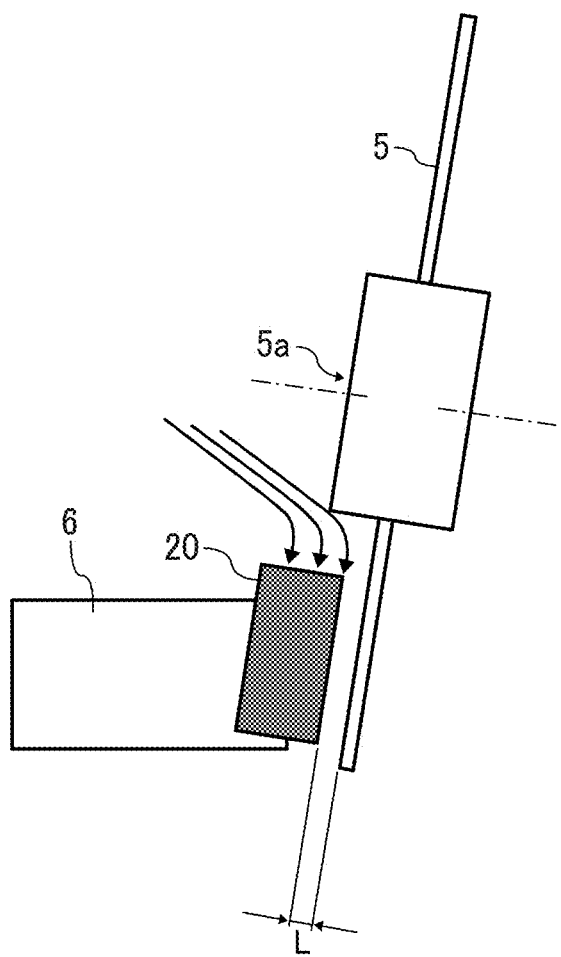
FIG. 8 is a schematic side view of the shield and the color wheel having a clearance between the shield and the color.

A description is given of a clearance L between the shield 20 and the color wheel 5 with reference to FIG. 8. Even if the shield 20 is disposed, when the clearance L between the shield 20 and the color wheel 5 is large, an airflow may enter the clearance L and then inside the light tunnel 6 due to a positional relationship with respect to the color wheel 5.

As described above, for example, a clearance of several millimeters is set between the light tunnel 6 and the color wheel 5. The clearance L between the shield 20 and the color wheel 5 after disposing the shield 20 is preferably set 1.0 mm or less. With this configuration, dust intrusion into the light tunnel 6 can be effectively suppressed.

In the above described image projection apparatus 1 having a configuration that dust in external air may intrude inside the image projection apparatus 1 through an air-intake port or the like, an airflow around the color wheel can be changed to another airflow by disposing the shield so that the light tunnel is not intruded by the airflow, with which dust intrusion into the light tunnel can be effectively suppressed, and decrease of light transmittance can be effectively suppressed, with which decrease of luminance of projection light or projection image can be effectively suppressed, Further, an air filter is not disposed for the image projection apparatus 1 to prevent dust intrusion, with which cleaning and replacement of the air filter can be omitted, and rotation speed of the air-intake fan can be decreased, with which noise reduction can be achieved.

As to the above described image projection apparatus, dust intrusion to the light tunnel can be suppressed and luminance decrease of projection image can be suppressed. Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection apparatus comprising:
a light source configured to emit light;
an image generation element configured to generate an image;
an optical radiation system configured to irradiate the image generation element using the light emitted from the light source;
an optical projection system configured to project the image generated by the image generation element onto a projection face;
a color wheel, disposed on a light path of light emitted from the light source, configured to separate the light while being rotated;
a light tunnel configured to guide light exiting from the color wheel to the optical radiation system; and
a shield disposed in a space between the color wheel and the light tunnel in a light radiation direction from which the light from the light source is irradiated, the shield covering at least a part of a side of the light tunnel facing a rotation center of the color wheel, the shield and the color wheel being tilted at an angle that is offset from a direction that is perpendicular to an optical axis of light traveling from the light source to the light tunnel.

2. The image projection apparatus of claim 1, wherein the shield covers an area extending at least a part of a top face of the light tunnel in the space, and the top face faces the rotation center of the color wheel.

3. The image projection apparatus of claim 1, wherein the shield covers an area extending at least a part of a top face and a part of both side faces of the light tunnel in the space.

4. The image projection apparatus of claim 1, wherein the shield has a clearance of 1 mm or less with the color wheel.

5. The image projection apparatus of claim 1, wherein the shield is made of aluminum.

6. The image projection apparatus of claim 1, wherein the shield is U-shaped.

7. An image projection apparatus comprising:
a light source configured to emit light;
a color wheel on a light path of light emitted from the light source, the color wheel configured to separate the light while being rotated;
a hollow tube in the light path of the light exiting from the color wheel; and
a shield between the color wheel and the hollow tube in a light radiation direction, the shield covering at least a part of a side of the hollow tube facing a rotation center of the color wheel, the shield being tilted at an angle that is offset from a direction that is perpendicular to an optical axis of light traveling from the light source to the hollow tube.

* * * * *